(12) United States Patent
Kuenzner

(10) Patent No.: US 6,452,570 B1
(45) Date of Patent: Sep. 17, 2002

(54) DEVICE FOR CONTROLLING THE REPRODUCTION OF AN IMAGE DISPLAYED ON A VEHICLE SCREEN

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/377,656

(22) Filed: Aug. 19, 1999

(30) Foreign Application Priority Data

Aug. 19, 1998 (DE) ......................................... 198 37 510

(51) Int. Cl.$^7$ ................................................. G09G 5/00
(52) U.S. Cl. ........................... 345/7; 345/781; 345/788; 345/798; 345/184; 345/619; 345/661; 345/666; 701/200; 701/201; 701/208
(58) Field of Search ............................ 345/7, 781, 788, 345/798, 184, 619, 661, 666; 701/200, 201, 208

(56) References Cited

U.S. PATENT DOCUMENTS

| | | | |
|---|---|---|---|
| 5,398,188 A | * 3/1995 | Maruyama | 364/449 |
| 5,612,881 A | 3/1997 | Moroto et al. | 701/209 |
| 5,884,217 A | * 3/1999 | Koyanagi | 701/211 |
| 5,964,810 A | * 10/1999 | Hirano et al. | 701/28 |
| 6,029,106 A | * 2/2000 | Hale et al. | 701/50 |
| 6,084,598 A | * 7/2000 | Chekerylla | 345/441 |
| 6,128,006 A | * 10/2000 | Rosenberg et al. | 345/163 |
| 6,128,553 A | * 10/2000 | Gordon et al. | 701/3 |
| 6,154,201 A | * 11/2000 | Levin et al. | 345/184 |
| 6,215,490 B1 | * 4/2001 | Kaply | 345/340 |

FOREIGN PATENT DOCUMENTS

| | | |
|---|---|---|
| DE | 34 04 047 | 8/1985 |
| DE | 296 04 717 | 7/1996 |
| DE | 692 07 426 | 9/1996 |
| WO | WO 96/14633 | 5/1996 |

* cited by examiner

Primary Examiner—Richard Hjerpe
Assistant Examiner—Abbas Abdulselam
(74) Attorney, Agent, or Firm—Crowell & Moring LLP

(57) ABSTRACT

The device for controlling a map section reproduced on a screen is characterized by a window displayed on the screen, said window marking the map section, and by a control element that is rotatable around its lengthwise axis and can be deflected transversely to the lengthwise axis, with the size of the map section displayed in the window being adjustable by the rotational movement of the control element and with the position of the window being adjustable within the road map by the transverse movement of the control element.

20 Claims, 1 Drawing Sheet

DEVICE FOR CONTROLLING THE REPRODUCTION OF AN IMAGE DISPLAYED ON A VEHICLE SCREEN

BACKGROUND AND SUMMARY OF THE INVENTION

This application claims the priority of German patent document 198 37 510.7, filed Aug. 19, 1998, the disclosure of which is expressly incorporated by reference herein.

The invention relates to a device for controlling the reproduction of an image displayed on a vehicle screen. The image for example is a portion of a road map. Devices of this kind are used in vehicles and especially in navigation systems in vehicles. A navigation system is a system which, for a given location of the vehicle, and with knowledge of the target location, automatically calculates the optimum travel route and provides appropriate optical and/or acoustic directions to the driver in order to reach the destination without using conventional map material.

Screen-based navigation systems of this kind frequently require changing the map section being displayed, for example in order to recognize a geographic point as a goal, and possibly, to mark it as well. For this purpose, the window that determines the portion of the map section displayed as a whole or partly on the screen causes the map section to be displaced. The map is then, so to speak, "pushed under the screen." It may also be necessary to change the scale of the map, for example in order to be able to better recognize a desired location or to find it within the geographic area. In known navigation systems, displacing the window and changing the map scale are separate functions that can be adjusted by separate buttons, possibly under menu control.

This disadvantageously results in long viewing and actuating times. The use of buttons further requires gripping. Moreover, buttons take up considerable space. The use of a menu control requires changing between different modes to perform the two functions.

Another application of the invention is a screen-supported operating guide, like that known from German patent document DE 4410985 A. It may be necessary to display the operating or function information for a functional element, for example a switch, on the screen as quickly and as comfortably as possible.

The goal of the invention is to provide a device of the above-mentioned type with which both the displacement of the window on the picture of the map as well as the size of the image section marked by the window can be changed simply and quickly.

The invention achieves this goal by providing a device for controlling the reproduction of an image reproduced on a vehicle screen, characterized by a window displayed on the screen. The window is smaller than the dimensions of the screen and marks an image unit. The window is capable of being deflected by a control element that can be rotated around a lengthwise axis and transversely to the lengthwise axis. The size of the image unit displayed in the window can be varied as a result of the rotational movement of the control element and the position of the window can be adjusted within the screen by the transverse movement of the control element.

In the case of a map section displayed as an image, the translational movement of the control element shifts the position of the frame within the map section and the rotary movement changes the size of the map section.

Advantageous embodiments of the invention are described herein. These embodiments relate both to the ability of the control element to move and also to the associated changes in the images or image segments displayed. For example, the transverse movement of the control element can take place reversibly relative to a middle position. Also, during deflection of the control element, the position change can be performed at a constant speed. Further advantageously, latching positions are provided for the rotational movement of the control element and an image detail size is associated with each latching position. Also, the size of the window can remain constant even during rotational movement of the control element. Enlargement/reduction of the image detail is produced by a corresponding decrease or increase of the image scale.

In one preferred embodiment, the image is a portion of a road map and the image detail is a location. In another embodiment, the image is a view of the interior of the vehicle and the image detail is a functional element contained therein.

In a further embodiment, an enter function is provided by which the image detail located in the center of the window can be selected. The enter function can advantageously be performed via an axial movement of the control element.

Another embodiment allows the possibility of fixing a location by appropriately changing the map section and processing is in a navigation system.

Other objects, advantages and novel features of the present invention will become apparent from the following detailed description of the invention when considered in conjunction with the accompanying drawings.

DETAILED DESCRIPTION OF THE DRAWINGS

Figure 1:
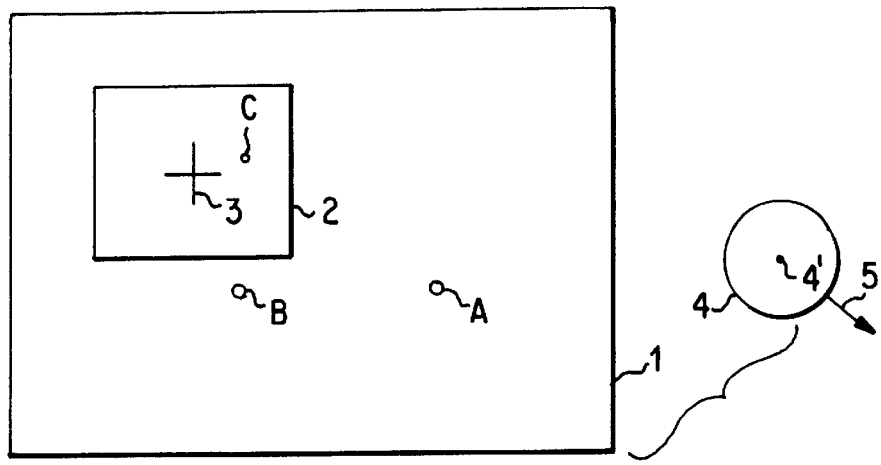
FIG. 1 shows a road map displayed on a screen and a corresponding control element in a top view.

In a navigation system for a vehicle (not shown in detail) a map section is located on a screen 1 and symbolized by three markings (for example locations A, B, C). In addition, a frame or window 2 with a central reticle 3 is located within the screen. With the aid of a manually operable input element 4, the reproduced map section can be controlled in terms of its position within an outline map and in terms of its scale. This is explained by way of FIGS. 2 and 3.

It is assumed that marking A is of particular interest for the vehicle user. It is intended to serve for example as a starting or target location for a travel route to be specified. Beginning with the position of frame 2, as shown in FIG. 1, frame 2 can be moved down and to the right in the image. operating element 4, as is itself known, for example from European patent document EP 0 366 132 B, can be rotated around its axis 4'; it is also movable reversibly in the axial direction, and has two translational degrees of freedom, in other words it can be moved or tilted horizontally and vertically to axis 4'.

Figure 2:
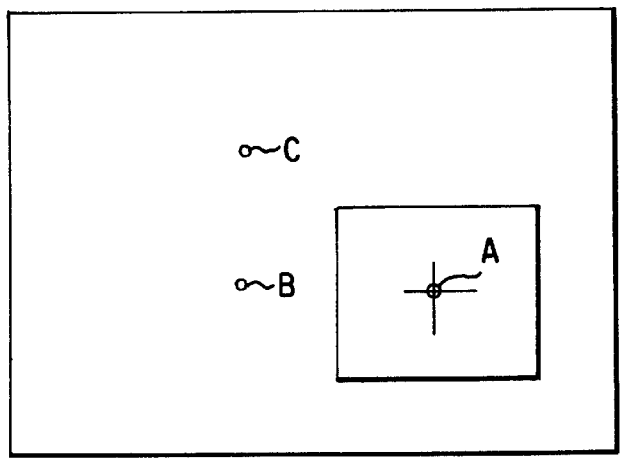
FIG. 2 shows the movement of a window within the road map during a translational movement of the control element.
Figure 3:
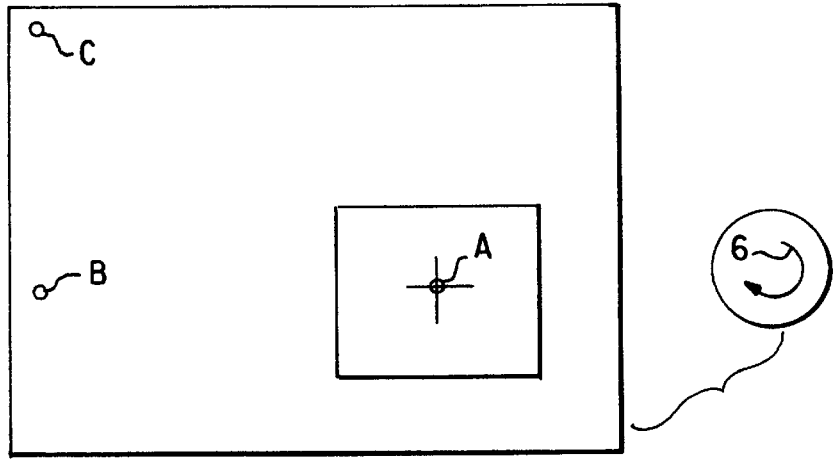
FIG. 3 shows a change in scale produced by a rotational movement of the control element.

As a result of the translational movement of operating element 4 in the direction of arrow 5 shown in FIG. 1, frame 2 is moved on the screen 1 in the direction of arrow 5 (FIG. 2). The reticle 3, as shown in FIG. 2, now marks point A. If the desired point is not on screen 1, it is possible to reproduce this point on the screen. To do so, frame 2 is controlled by the translational movement of operating element 4 to be initially moved up to the edge of screen 1. At this point, the image of the screen section remains. If the operating element 4 remains deflected further translationally as shown, frame 2 is almost against its stop. Then the screen section is moved in the direction opposite the direction of arrow 5. As a result, map sections are displayed one after the other on screen 1 that are located roughly down and to the right in the outline map.

Beginning with the situation shown in FIG. 2, it is possible to display image point A on an enlarged scale. For this purpose, operating element 4 is rotated around its axis (arrow 6 of FIG. 3). As a result, the scale is increased, or reduced by rotation in the opposite direction. When the scale is increased, image point A is shown enlarged (See FIG. 3). Since the scale changes overall, points B and C are located correspondingly farther from one another and from point A.

Image point A for example can be entered into the navigation system as the end point of a travel route, via an axial movement of the operating element 4. Image point A is then used without additional measures to calculate the travel route.

If the image displayed on screen 1 is not a map but, for example, a picture of the interior of the vehicle, a detail, in this case A once again, can be selected by a suitable movement of frame 2. If the detail is at the location marked by reticle 3, operating instructions for the operating switch marked by A for example can be reproduced on the screen 1 following axial movement of operating element 4. The reproduction can be displayed for example in a superimposed window or in place of the interior image initially displayed on screen 1. Here again it is possible to change the scale of the display by a rotational movement of the operating element 4.

With the invention, it is possible, without switching between different input modes, to identify and select very quickly and intuitively a target or a significant image point. The entire manipulation takes place with a single operating element without time-consuming changing of operating elements.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for controlling reproduction of a displayed image, the device comprising:
   a vehicle display screen having a viewing area for the displayed image;
   a window displayed on the vehicle display screen, said window having an area smaller than the viewing area of the vehicle display screen, said window further marking an image unit of the displayed image over which the window is arranged;
   a control element operable to deflect the window, the control element being both rotatable about a lengthwise axis and movable transversely to the lengthwise axis;
   wherein a size of the image unit displayed in the window is variable as a result of the rotational movement of the control element; and further wherein a position of the window is adjustable within the vehicle display screen by the transverse movement of the control element so as to mark a different image unit of the displayed image over which the window is arranged.

2. The device according to claim 1, wherein the transverse movement of the control element is reversible relative to a mid position.

3. The device according to claim 2, wherein during the transverse movement of the control element, the position of the window is adjusted at a constant speed.

4. The device according to claim 1, further comprising latching positions provided for the rotational movement of the control element, image detail sizes being associated with each latching position.

5. The device according to claim 2, further comprising latching positions provided for the rotational movement of the control element, image detail sizes being associated with each latching position.

6. The device according to claim 3, further comprising latching positions provided for the rotational movement of the control element, image detail sizes being associated with each latching position.

7. The device according to claim 4, wherein a window size remains constant during the rotational movement of the control element, and further wherein enlargement/reduction of the image detail size is produced by a corresponding increase/decrease of the image scale.

8. A device according to claim 1, wherein the image is of a portion of a road map, and an image detail of the image is a particular location.

9. A device according to claim 1, wherein the image is a view of a vehicle interior, and an image detail of the image is a functional element contained in the vehicle interior.

10. The device according to claim 1, wherein the control element further comprises an enter function by which the image located in a center of the window is selectable.

11. The device according to claim 8, wherein the enter function is activated via an axial movement of the control element.

12. The device according to claim 8, wherein the particular location is transferred into an associated navigation system.

13. The device according to claim 10, wherein the image detail located in the center of the window is transferred into an associated navigation system.

14. The device according to claim 12, wherein the particular location is identical to one of a starting point and travel route destination.

15. The device according to claim 9, wherein the control element further comprises an enter function, an activation of said enter function displaying operating instructions associated with the functional element on the vehicle display screen.

16. The device according to claim 8, wherein activation of the enter function displays additional information concerning the image detail.

17. A method for controlling a displayed image on a vehicle display screen, the method comprising the acts of:
   using a window to mark an image unit on the vehicle display screen of the displayed image over which the window is arranged, the window having a viewing area smaller than a viewing area of the vehicle display screen;
   rotating a control element about its axis to vary the size of the image unit displayed in the window; and
   transversely moving the control element relative to its axis to adjust a position of the window on the vehicle display screen so as to mark a different image unit of the displayed image over which the window is arranged.

18. The method according to claim 17, wherein the act of transversely moving the position of the window is reversible relative to a middle position.

19. The method according to claim 17, wherein the transverse movement of the position of the window further comprises the act of moving the window at a constant speed upon the transverse movement of the control element.

20. The method according to claim 17, further comprising the act of maintaining the size of the window constant during the rotational movement of the control element and enlarging/reducing an image detail via a corresponding increase/decrease of an image scale.

* * * * *